3,086,979
N-(DIPHENYLMETHYLBENZOYL)AMINO-
ALKANOIC ACIDS
Carl Peter Krimmel, Mundelein, Ill., assignor to G. D. Searle & Co., Chicago, Ill., a corporation of Delaware
No Drawing. Filed July 19, 1960, Ser. No. 43,726
9 Claims. (Cl. 260—389)

The present invention relates to compounds of the formula

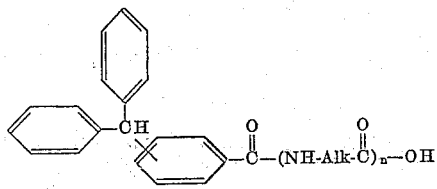

wherein $n$ is a small positive integer, and Alk is alkylene. The term Alk in the foregoing formula represents essentially lower alkylene radicals, which is to say bivalent saturated acyclic straight- or branched-chain hydrocarbon groupings.

The compounds to which this invention relates are useful because of their valuable pharmacological properties. Specifically, they are inhibitors of hepatic cholesterol synthesis; they also possess anti-fungal activity, for example, against fungi of the Trichophyton group. Manufacture of the subject compounds is accomplished by condensation of an acid halide of the formula

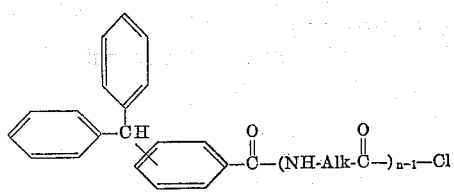

with an amino acid. Embodiments containing more than one amide group are also prepared by condensation of an acid of the formula

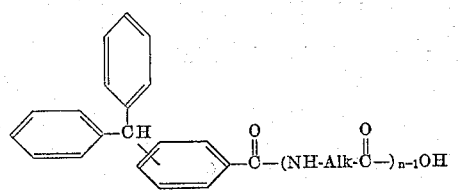

with the ester of an amino acid in the presence of dicyclohexylcarbodiimide followed by conversion to the free acid.

The following examples describe in detail compounds illustrative of the present invention and methods for their manufacture; the invention is not to be construed as limited thereby either in spirit or in scope. In the examples to follow temperatures are given in degrees centigrade, and amounts of materials in parts by weight.

*Example 1*

*N-(p-diphenylmethylbenzoyl)glycine.*—A mixture of 20 parts of p-diphenylmethylbenzoic acid, 33 parts of thionyl chloride and 128 parts of carbon tetrachloride is heated under reflux for 3 hours. At the end of this time the solvent and excess thionyl chloride are distilled on the steam bath at diminished pressure; the last traces of thionyl chloride are removed by addition of anhydrous benzene, and distillation. The resultant p-diphenylmethylbenzoyl chloride is used without further purification. To a stirred solution of 9 parts of glycine and 14 parts of sodium hydroxide in 350 parts of water is added a solution of 22 parts of p-diphenylmethylbenzoyl chloride in 395 parts of acetone; a slight rise in temperature occurs. The resultant mixture is heated in an open vessel until the acetone is evaporated, and the aqueous solution thus obtained is acidified with dilute hydrochloric acid. The resultant gum is treated with ice cold water until it becomes friable, and the granules are dried in air. The crude N-(p-diphenylmethylbenzoyl)glycine thus obtained is crystallized from isopropyl alcohol with charcoal decolorization; the puirfied product melts at 210–218°. The structure may be expressed as

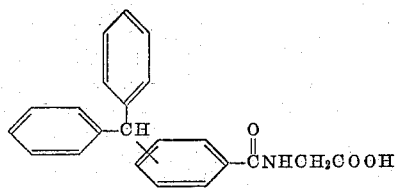

*Example 2*

*N-(p-diphenylmethylbenzoyl)-β-alanine.*—Substitution of 11 parts of β-alanine for the glycine of Example 1 gives, by the procedure therein detailed, N-(p-diphenylmethylbenzoyl)-β-alanine. The crude sample thus obtained is recrystallized from benzene with charcoal decolorization; the pure sample melts at 157–159°. The structure may be expressed as

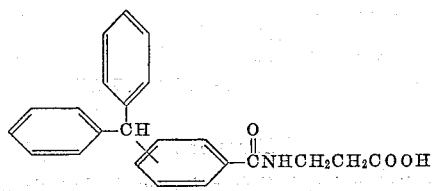

*Example 3*

*N-(p-diphenylmethylbenzoyl)-γ-aminobutyric acid.*—Substitution of 12 parts of γ-aminobutyric acid for the glycine of Example 1 gives, by the procedure therein detailed, crude N-(p-diphenylmethylbenzoyl)-γ-aminobutyric acid; the pure sample, prepared by recrystallization from benzene with charcoal decolorization, melts at 165–169°. The structure may be expressed as

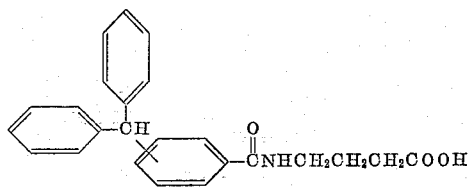

*Example 4*

*N-(p-diphenylmethylbenzoyl)alanine.*—Substitution of 11 parts of alanine for the glycine of Example 1 gives by the procedure therein detailed, N-(p-diphenylmethylbenzoyl)alanine. The structure may be expressed as

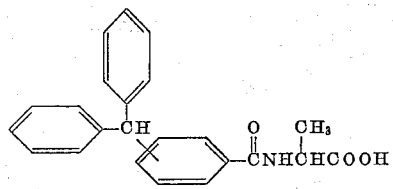

*Example 5*

*N-(m-diphenylmethylbenzoyl)glycine.*—Substitution of 22 parts of m-diphenylmethylbenzoyl chloride for the p-diphenylmethylbenzoyl chloride of Example 1 gives, by the procedure therein detailed, N-(m-diphenylmethylbenzoyl)-glycine. The structure may be expressed as

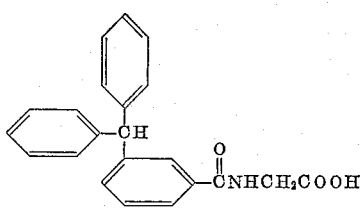

Example 6

N-(m-diphenylmethylbenzoyl)-β-alanine.—Substitution of 22 parts of m-diphenylmethylbenzoyl chloride for the p-diphenylmethylbenzoyl chloride and 11 parts of β-alanine for the glycine of Example 1 gives, by the procedure therein detailed, crude N-(m-diphenylmethylbenzoyl)-β-alanine. The white gum which separates on acidification shows no tendency to solidify. The supernatant liquid is removed by decantation, and the gum is washed with fresh water. The residue is taken up in 616 parts of benzene, and final traces of water are removed by azeotropic distillation. The benzene solution is subjected to charcoal decolorization, and cooled to give the pure compound, melting at 156–158°. The structure may be expressed as

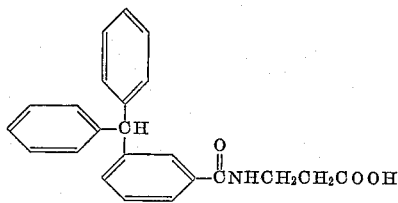

Example 7

N-(m-diphenylmethylbenzoyl)-α-aminobutyric acid.—Substitution of 22 parts of m-diphenylmethylbenzoyl chloride for the p-diphenylmethylbenzoyl chloride and 12 parts of α-aminobutyric acid for the glycine of Example 1 gives, by the procedure therein detailed, N-(m-diphenylmethylbenzoyl)-α-aminobutyric acid. The structure may be expressed as

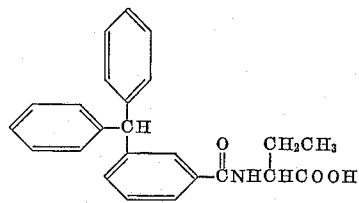

Example 8

N-(o-diphenylmethylbenzoyl)-β-alanine.—Substitution of 22 parts of o-diphenylmethylbenzoyl chloride for the p-diphenylmethylbenzoyl chloride and 11 parts of β-alanine for the glycine of Example 1 gives, by the procedure therein detailed, crude N-(o-diphenylmethylbenzoyl)-β-alanine; the pure sample, recrystallized from 2-butanone with charcoal decolorization, melts at 186–188°. The structure may be expressed as

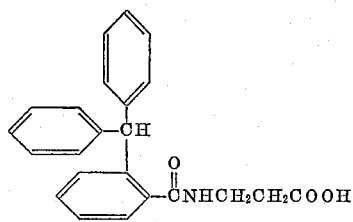

Example 9

N-(o-diphenylmethylbenzoyl)-γ-aminobutyric acid.—Substitution of 22 parts of o-diphenylmethylbenzoyl chloride for the p-diphenylmethylbenzoyl chloride and 12 parts of γ-aminobutyric acid for the glycine of Example 1 gives, by the procedure therein detailed, N-(o-diphenylmethylbenzoyl)-γ-aminobutyric acid. The structure may be expressed as

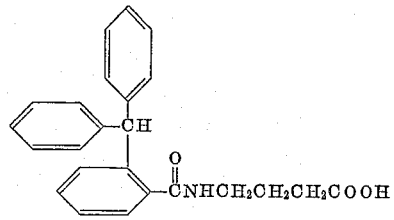

Example 10

N-(o-diphenylmethylbenzoyl)alanine.—Substitution of 22 parts of o-diphenylmethylbenzoyl chloride for the p-diphenylmethylbenzoyl chloride and 11 parts of alanine for the glycine of Example 1 gives, by the procedure therein detailed, N-(o-diphenylmethylbenzoyl)-alanine. The structure may be expressed as

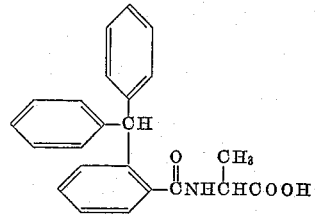

What is claimed is:
1. A compound of the structural formula

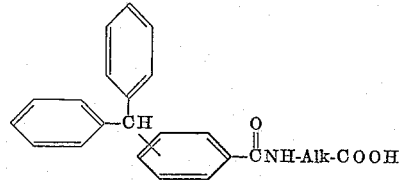

wherein Alk is a lower alkylene of less than 4 carbon atoms.
2. A compound of the formula

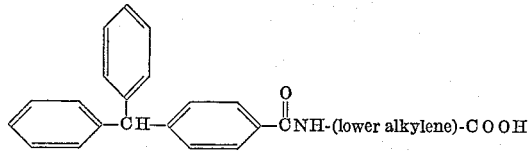

wherein the lower alkylene radical contains less than 4 carbon atoms.
3. N-(p-diphenylmethylbenzoyl)glycine.
4. N-(p-diphenylmethylbenzoyl)-β-alanine.
5. N-(p-diphenylmethylbenzoyl)-γ-aminobutyric acid.
6. A compound of the formula

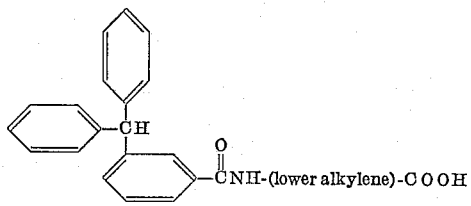

wherein the lower alkylene radical contains less than 4 carbon atoms.
7. N-(m-diphenylmethylbenzoyl)-β-alanine.

8. A compound of the formula
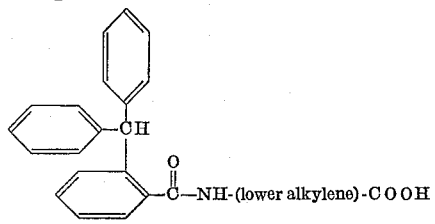
wherein the lower alkylene radical contains less than 4 carbon atoms.
9. N-(o-diphenylmethylbenzoyl)-β-alanine.
References Cited in the file of this patent
UNITED STATES PATENTS
2,678,321   Krimmel _____ May 11, 1954